Dec. 19, 1961  G. B. WILKEN  3,013,358
MOLE TRAP
Filed Feb. 23, 1960
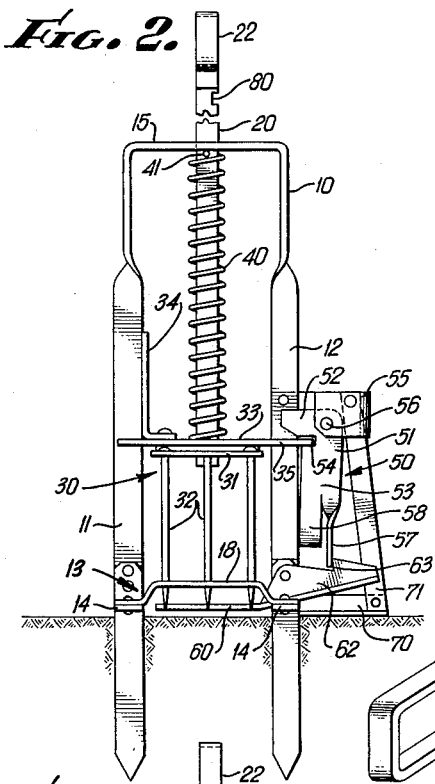
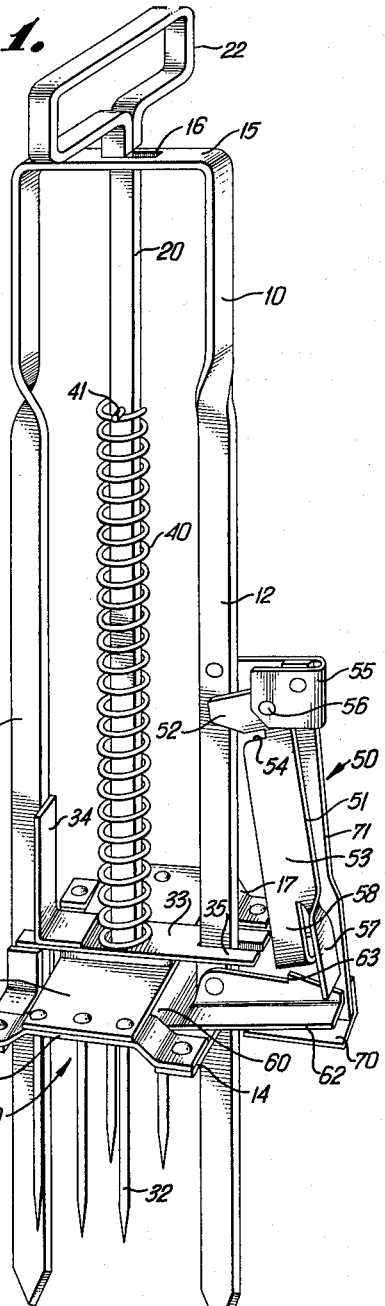
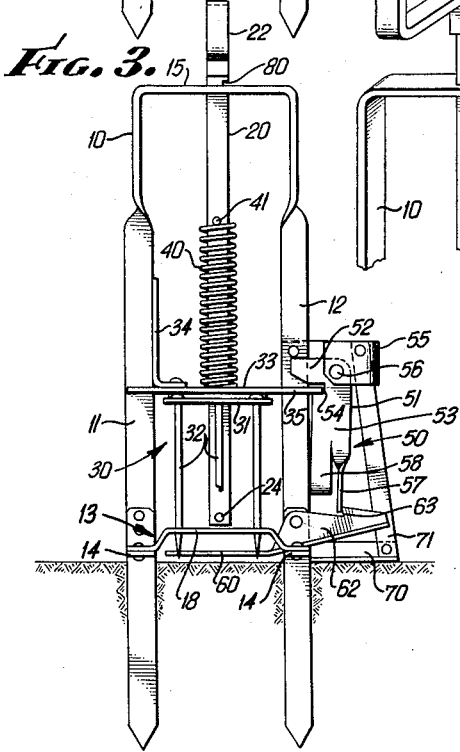
INVENTOR.
GEORGE B. WILKEN
BY
Miketta and Glenny
ATTORNEYS.

United States Patent Office 3,013,358
Patented Dec. 19, 1961

3,013,358
MOLE TRAP
George B. Wilken, 1307 Castlewood Dell, Louisville, Ky.
Filed Feb. 23, 1960, Ser. No. 10,230
4 Claims. (Cl. 43—80)

This invention relates to mole traps which are positioned above mole burrows and which employ compression spring means to actuate impaling means which penetrate portions of the burrow when the trap is sprung. More particularly, the invention relates to a mole trap wherein the compression spring means may be set in a cocked position by a downward pushing movement of a portion of the trap thereby employing the weight of the user in the setting of the trap.

The effectiveness of a mole trap in capturing moles by impaling them in their burrows is largely dependent upon the force with which the impaling means strikes downwardly into the burrow. Prior proposed traps have heretofore required the user to raise the impaling means to a cocked position and simultaneously compress the spring means employed to actuate such impaling means, in a single upward pulling movement of a portion of the trap. The movable portion of the trap is normally a central rod having a compression spring means mounted about it and impaling means such as prongs attached to its bottom end portion. The compressive strength of the spring means allowable in such prior traps was therefore limited by the pulling strength of the user and required that such prior traps employ no more than about a thirty-five to forty pound compressive force spring means or less. An effective mole trap preferably employs compression spring means requiring between sixty and eighty pounds force to be compressed.

One of the disadvantages of prior proposed mole traps constructed as above was the difficulty in preparing holes for relative free passage of the prongs to the burrow. Usually such preparation includes first positioning and setting the trap and then moving the prongs up and down to form such prong holes. When such a trap is then cocked, the pulling action and simultaneous straining to cock the trap tends to disturb the original set position of the trap and the prongs are no longer aligned with the prepared holes. The present invention effectively avoids this problem because during preparation of prong holes the spring is at all times relaxed, the trap is cocked without compressing the spring so there is no tendency to disturb the prepared prong holes, and the spring is placed under compression by a downward push motion which may be readily controlled so that the trap legs will not be laterally moved or inclined.

It is therefore an object of this invention to provide an effective mole trap employing a strong spring force which may impel mole impaling means rapidly into and through portions of a mole burrow and yet may be easily set in a cocked position by a user having normal physical strength.

It is also an object of this invention to provide a mole trap which may easily be manipulated over a mole burrow in proper relationship thereto such that the trigger mechanism will be actuated in response to the passage of a mole through the burrow.

Generally stated, the invention contemplates a mole trap in which the trap is set by a two-step, pull and push operation. A vertical trap-setting rod is slidably mounted within an inverted U-shaped frame which has leg portions adapted to straddle a mole burrow to anchor or set the frame in the ground. A ported plate having a plurality of downwardly facing mole-impaling prongs is slidably mounted on the lower portion of the rod and is constantly urged toward the bottom of the rod by a compression spring associated with the rod and plate, the plate being constrained by a head or bottom pin on the end of the rod. The ported plate is also adapted to slide within the frame such that when the trap-setting rod is raised as by pulling in the first step of the setting operation, the ported plate is also raised within the frame until it is caught in a cocked position by a releasable latch means provided on one of the leg portions. The rod is then pressed or pushed downwardly, employing the weight of the user, in the second step of the setting operation to compress the spring between an upper pin on the rod and the ported plate as the rod passes downwardly through the ported plate. The rod is then locked in such lower position by locking means on the frame and the trap is set, ready to be released by a trigger mechanism which may be contacted by and is responsive to displacement of portions of the ground raised by the passage of a mole thereunder. Upon the release of the latch means the ported plate, in turn, is released and the compressed spring drives the ported plate rapidly downward toward the lower end of the rod causing the prongs projecting from the ported plate to penetrate deeply into and through the burrow and between the leg portions of the frame.

The invention also contemplates the provision of a foot and guide means which interconnects the leg portions of the inverted U-shaped frame a preselected distance above ends of the leg portions and is adapted to locate the frame and trigger mechanism relative to the ground surface to direct and guide the prongs on the ported plate and to act as a stop against which the ported plate may abut ending its downward movement.

The invention will be described in greater detail in the following description of an exemplary embodiment of a mole trap according to the invention in which reference will be made to the appended drawing in which:

FIG. 1 is a perspective view of a mole trap according to the invention with the ported plate in a lower stop or trap sprung position.

FIG. 2 is a front elevation of the mole trap of FIG. 1 showing the mechanism with the ported plate in an upper cocked position and the spring means uncompressed.

FIG. 3 is a front elevation of the mole trap of FIG. 1 showing the mechanism in trap-set or loaded position with the ported plate in an upper cocked position and the spring means compressed.

FIG. 4 is an enlarged fragmentary view of the upper portion of the mole trap of FIG. 1.

An exemplary embodiment of a mole trap, according to the invention, is shown in FIG. 1 and includes generally an inverted U-shaped frame 10, a vertical trap-setting rod 20, slidably mounted therein, mole-impaling means, indicated generally at 30, a compression spring means 40, releasable latch means, indicated generally at 50, and trigger means 60.

Frame 10 is provided with spaced, parallel leg portions 11 and 12 which are adapted to be pushed into the ground on either side of a mole burrow to anchor or set frame 10 in the ground relative to such burrow. A foot and guide means 13 interconnects leg portions 11 and 12 in preselected spaced relation to bottom ends thereof and provides forwardly and rearwardly extending foot members 14 which locate, support, and position frame 10 relative to the ground surface when anchored therein. Frame 10 may also be provided with an aperture or port 16 in its top portion 15 through which the vertical trap-setting rod 20 is slidably mounted.

Rod 20 is adapted to move vertically within the U-shaped frame 10 in a central or middle area of frame 10 and may be spaced equal from the leg portions 11 and 12. The upper end of rod 20 is preferably provided with a handle 22 which is positioned above the top portion 15 of U-shaped frame 10 and is adapted to be grasped when raising or lowering rod 20 within frame 10.

Mole-impaling means, indicated generally at 30, are provided to impale and capture a mole passing through a burrow situated between the leg portions 11 and 12. Such means may comprise a centrally ported plate 31 having a plurality of prongs 32. Impaling prongs 32 extend downwardly from the ported plate 31 and may be arranged in sets of three, the sets being in generally parallel and spaced array. As shown in FIG. 1, such impaling prongs 32 may be positioned relative to guide plates 17 and 18 on the foot and guide frame 13 such that they pass through and are guided within ports provided in the guide plates 17, 18.

The ported plate 31 is mounted within frame 10 for vertical movement along the leg portions 11 and 12 from a lower stop position, shown in FIG. 1, to an upper cocked position shown in FIGS. 2 and 3. Such mounting within frame 10, is accomplished by providing the ported plate 31 with guide means, which may be in the form of a transversely extending guide bar 33 fixed to the ported plate as shown in FIG. 1. Guide bar 33 is provided with open-ended end slots which slidably, loosely embrace and engage the inner surfaces and side portions of legs 11 and 12 to align the ported plate 31 between the legs 11 and 12 during vertical movement thereof. In addition, an upright stabilizing arm 34 may be provided at one end of bar 33, as shown in FIG. 1, to maintain bar 33 at generally right angles to the leg portions 11 and 12.

Trap-setting rod 20 passes through the ported plate 31, at a generally central location therein, in a loose fit such that sliding relation between rod 20 and ported plate 31 is allowed. The lower end of the rod 20 is provided with a pin or head 24, as shown in FIG. 3, which upwardly constrains the ported plate 31 at the lower end of rod 20 such that the ported plate 31 may be lifted by an upward movement of rod 20, as from the position in FIG. 1 to that of FIG. 2. Ported plate 31 is normally lightly urged against the head 24 at the lower end of rod 20 by a compression spring means 40, the upper end of said spring means being seated against a pin 41 carried by rod 20 in spaced relation to frame portion 15.

Releasable latch means indicated generally at 50 are carried on the leg 12, and spaced thereon above the foot section 13. The releasable latch means are adapted to engage and hold the ported plate 31 of the impaling means 30, in the upper cocked position of FIGS. 2 and 3, when plate 31 is raised by an upward movement of rod 20 from the lower stop position of FIG. 1. Such latching means may comprise a generally L-shaped elongated latch member 51 having a short arm 52, directed inwardly of the frame and defining a notch 54. Latch 51 is pivotally connected at 56 to an extension 55 on leg 12 and above the notch 54. As the ported plate 31 is raised within the frame 10 by an upward movement of the rod 20, an extension 35 of the guide bar 33 contacts arm 52 of latch 51, pivoting latch 51 from the position of FIG. 1 to the trap-cocked position of FIG. 2 wherein the extension 35 is engaged in and held by the notch 54. As the latch 51 is pivoted upon being contacted by the extension 35 the lower end of latch member 51 is brought into engagement with a portion of the trigger plate 60 which retains the latch 51 and ported plate 31 in the cocked position of FIGS. 2 and 3.

Trigger means are provided to release the releasable latch means when a mole passes beneath the trap through the burrow. Such means may comprise a trigger plate 60 pivotally connected to leg 12 of the U-shaped frame 10 such that the plate is positioned beneath the ported plate 31 and above the foot sections 14 of the foot and guide frame 13. The plate 60 is thereby positioned relative to the ground by such foot sections 14 such that it will be tripped by a small upheaval of the ground under the plate portion due to the passage of a mole through the burrow. The trigger plate 60 is also provided with a notched extension 62, having a notch 63, such that an end portion 57 of the latch 51 is engaged by and held by the extension 62 when latch 51 is pivotally rotated about the connection 56 during cocking. An upward movement of the plate portion will cause the trigger plate 60 to pivot and thereby release the latch 51 and the impaling means 30. An additional element 58 may be provided at the lower end of latch member 51 to engage the end of extension 35 to limit inward rotation of latch 51 so that jamming of the latch means in relaxed condition will be prevented. In trap-set position the element 58 may contact the edge of leg 12 (FIG. 2) to again limit inward swinging of the latch member 51.

A shield 70 may also be provided to protect the trigger plate 60 from accidental tripping and a strut 71 may be interconnected between the extension 55 and shield 70 to provide added stability to such members.

As shown in FIGS. 2 and 3, the spring means 40 may be compressed against the guide bar 33 by a downward movement of the rod 20 from the position of that in FIG. 2 to that of FIG. 3. As the trap-setting rod 20 is pressed or pushed downwardly within the frame 10 and passes through the ported plate 31, which is being held by the latch member 51 in an upper cocked position, spring means 40 is compressed between the pin 41 and the guide bar 33. The trap is therefore set or loaded by a downward movement of rod 20 which allows the use of the operator's weight in such setting or loading operation.

Locking means are carried by the vertical rod 20 which cooperate with the U-shaped frame 10 for holding the rod 20 in the trap-cocked position of FIG. 3. Such locking means may comprise a notch 80 in the edge of rod 20 at an upper portion of rod 20 beneath the handle 22 such that it may engage the upper portion 15 of frame 10 on a peripheral portion of the port 16 by a lateral positioning movement of the rod 20 within the port 16.

It may therefore be seen that a mole trap, according to the invention, employs a two-step, pull-push operation to effectively set or load the trap. Passage of a mole will raise the trigger plate 60 about its pivot and thereby lower the extension 62 so that the notch 63 is disengaged from end portion 57 of the latch member 51.

The compressive force of the spring 40 acts against the lower edge of notch 54 to pivot the latch member out of holding engagement with the ported plate 31. The spring means then drives the plate 31 downwardly and the impaling means 30 forcibly strike and penetrate into the mole therebeneath. The extent of such downward motion of the impaling means, is limited by the guide plates 17 and 18 which are provided by the foot and guide frame 13 and which act as stops against which the ported plate 31 abuts. Since the impaling means 30 are positioned in the upper cocked position of FIG. 2 by an upward movement of rod 20 and the spring means 40 is thereafter compressed into the set position of FIG. 3 by a downward movement of rod 20, the weight of the user of the trap may be employed in compressing the spring means 40 to set the trap. A much stronger spring means may thereby be employed than is normally practical when the spring means is compressed and the trap set by an upward pull applied to a trap-set rod.

A mole trap according to the invention therefore, may drive the impaling means into a burrow with considerable force and is very effective in trapping and capturing moles.

While a single exemplary embodiment of a mole trap has been herein described, it is to be understood that it is not intended to limit the scope of the invention and that other embodiments, adaptations and modifications may be made within the scope of this invention as defined by the following claims.

I claim:

1. A mole trap adapted to be spring-loaded by a downwardly directed movement, comprising: a U-shaped frame including leg portions adapted to be set in the ground on either side of a mole burrow; a mole-impaling means including a ported plate having impaling prongs, said ported plate being mounted for vertical movement along said leg portions from a lower stop position to an upper cocked position; a foot and guide frame connecting leg portions of the U-shaped frame and acting as a lower stop for said ported plate; a trigger plate pivotally connected to a leg of said U-shaped frame and below said ported plate, releasable latch means carried by one of said leg portions and associated with said trigger means, for holding said ported plate and impaling means in said upper cocked position; a vertical rod slidably held by said U-shaped frame and slidably extending through said ported plate, said rod having spring seat means spaced above said plate; spring means associated with said rod between said spring seat means and said ported plate to bias said ported plate toward a lower end of said rod, said spring means being compressible by downward motion of said rod when said plate is held in said upper cocked position by said releasable latching means; and a locking means carried by said rod and cooperating with said U-shaped frame for holding said rod with its spring in compressed, cocked position for release by said releasable latch means.

2. A mole trap comprising: a generally U-shaped frame including leg portions adapted to be set in the ground on either side of a mole burrow; a vertical rod slidably mounted within said U-shaped frame; mole-impaling means including a ported plate slidably mounted upon said vertical rod and means at the lower end of said rod upwardly constraining said ported plate thereon, said ported plate being provided with guide means adapted to engage and slide upon said leg portions; trigger means disposed below said impaling means and adapted to be associated with said burrow; releasable latching means associated with said trigger means and one of said leg portions adapted to engage and hold said ported plate in a raised cocked position when said plate is raised within said frame by an upward movement of said rod, said trigger means being adapted to release said releasable latching means when disturbed; spring means on said rod above said ported plate; and a compression spring associated with said vertical rod and said spring seat means to bias said ported plate toward a lower end of said rod, said spring being compressed when said plate is held in said raised position by said latching means and trigger means and said vertical rod is moved in a downwardly directed movement relative to said frame through said ported plate.

3. A mole trap adapted to be readily cocked by downward application of force comprising in combination: a frame means having spaced parallel leg members; mole-impaling means between said leg members and including a ported plate provided with downwardly extending impaling prongs; means for guiding said plate along said leg members; trigger means connected with one of said leg members; releasable latching means carried by said frame means for cooperable connection with said impaling means and said trigger means to releasably hold said impaling means in cocked position, said trigger means being adapted to release said releasable latching means in response to movement of a mole beneath said trigger means; and trap-setting means including a trap setting rod movable through said ported plate and relative to said frame means, said rod having means at the lower end of said rod constraining said ported plate thereon to lift said impaling means to a trap-cocked position when said rod is raised, said rod having spring seat means spaced above the plate, and a spring extending between said plate and spring seat means and held in relaxed condition during movement of the impaling means to said trap-cocked position, said rod being thus movable downwardly to compress said spring between said plate and spring seat means; and locking means for said rod to hold said spring in compression.

4. A trap for impaling burrowing animals comprising: a frame having leg portions adapted to be set in the ground adjacent a burrow; a rod slidably mounted in said frame for vertical movement relative to said ground; impaling means slidably mounted upon said rod and upwardly constrained thereon near a lower end thereof; spring means carried by said rod and downwardly constrained thereon near an upper portion thereof to bias said impaling means toward said lower end; releasable latch means associated with said frame and adapted to latchingly engage said impaling means when said last named means are raised relative to said frame by an upward motion of said rod to an upper-cocked position, said spring means being then in a relaxed state; trigger means associated with said frame and said latch means to hold said latch means in releasable latching engagement with said impaling means, holding said impaling means in said upper-cocked position until said trigger means is disturbed; and locking means associated with said rod and said frame to hold said rod in a lowered position against the urging of said spring, said spring being compressed upon a downward motion of said rod relative to said frame when said impaling means is held in said upper cocked position by said releasable latching means.

References Cited in the file of this patent

UNITED STATES PATENTS

| | | |
|---|---|---|
| 242,912 | Fort et al. | June 14, 1881 |
| 563,310 | Reger et al. | July 7, 1896 |
| 2,086,826 | Smith | July 13, 1937 |
| 2,589,385 | Howrey | Mar. 18, 1952 |